United States Patent
Cooper

(10) Patent No.: US 11,361,142 B2
(45) Date of Patent: Jun. 14, 2022

(54) ESTIMATING INTEGRATED CIRCUIT YIELD FROM MODELED RESPONSE TO SCALING OF DISTRIBUTION SAMPLES

(71) Applicant: Siemens Industry Software Inc., Plano, TX (US)

(72) Inventor: Joel Cooper, Saskatoon (CA)

(73) Assignee: Siemens Industry Software Inc., Plano, TX (US)

(*) Notice: Subject to any disclaimer, the term of this patent is extended or adjusted under 35 U.S.C. 154(b) by 0 days.

(21) Appl. No.: 17/007,956

(22) Filed: Aug. 31, 2020

(65) Prior Publication Data
US 2022/0067263 A1    Mar. 3, 2022

(51) Int. Cl.
*G06F 30/30*    (2020.01)
*G06F 30/398*    (2020.01)
(Continued)

(52) U.S. Cl.
CPC ........ *G06F 30/398* (2020.01); *G06F 2119/02* (2020.01); *G06F 2119/18* (2020.01)

(58) Field of Classification Search
CPC .... G06F 2119/18; G06F 30/39; G06F 9/5027; G06F 2111/08; G06F 30/367; G06F 9/3836; G06F 1/163; G06F 11/30; G06F 12/0815; G06F 2209/5017; G06F 2209/5018; G06F 2209/509; G06F 3/013; G06F 3/015; G06F 3/14; G06F 30/3323; G06F 30/392; G06F 8/4451; G06F 9/30079; G06F 9/3009; G06F 9/3802; G06F 9/3869; G06F 9/4806; G06F 9/5072; G06F 9/52; G06F 1/1626; G06F 1/1686; G06F 1/206; G06F 1/3278; G06F 11/3037; G06F 12/0802; G06F 12/0862; G06F 12/0873; G06F 12/0893; G06F 16/27; G06F 16/90; G06F 16/90335; G06F 2111/04; G06F 2111/10; G06F 2119/08; G06F 2203/0381; G06F 2212/1021; G06F 2212/455; G06F 2212/502; G06F 2212/601; G06F 3/012;
(Continued)

(56) References Cited

U.S. PATENT DOCUMENTS

| | | | |
|---|---|---|---|
| 2011/0066997 A1* | 3/2011 | O'Riordan | G06F 30/3323 716/139 |
| 2013/0185028 A1* | 7/2013 | Sullivan | G05B 19/4069 703/2 |

(Continued)

*Primary Examiner* — Binh C Tat

(57) ABSTRACT

A computing system can implement a circuit verification tool to perform scaled sampling of parameter values in a foundry model describing parameter variations for a manufacturing process capable of fabricating an integrated circuit described in a circuit design. The computing system can simulate the circuit design with the scaled samples of the parameter values, and build a geometric model to describe a response of the circuit design to the scaled samples of the parameter values during the simulation. The geometric model can include one or more failure regions corresponding to geometric descriptions for failures of the circuit design to meet a specification during simulation with the scaled samples of the parameter values. The computing system can estimate a yield for an output of the integrated circuit described by the circuit design based on the failure regions in the geometric model.

14 Claims, 4 Drawing Sheets

(51) Int. Cl.
*G06F 119/18* (2020.01)
*G06F 119/02* (2020.01)

(58) Field of Classification Search
CPC .......... G06F 3/017; G06F 3/038; G06F 3/147; G06F 30/00; G06F 30/20; G06F 8/433; G06F 8/4441; G06F 8/4442; G06F 8/45; G06F 8/458; G06F 9/30043; G06F 9/3005; G06F 9/30076; G06F 9/3838; G06F 9/3851; G06F 9/3887; G06F 9/4812; G06F 9/5016; G03F 1/36; G03F 1/84; G03F 7/70441; G03F 7/70516; G03F 7/70616; G03F 7/70625; H01L 25/50; H01L 23/5386; H01L 27/0207
USPC .................................. 716/100–108, 110–117
See application file for complete search history.

(56) References Cited

U.S. PATENT DOCUMENTS

| | | | |
|---|---|---|---|
| 2019/0239753 A1* | 8/2019 | Wentz .................... | H01J 31/501 |
| 2020/0126191 A1* | 4/2020 | Munkberg ................ | G06T 7/50 |

* cited by examiner

ESTIMATING INTEGRATED CIRCUIT YIELD FROM MODELED RESPONSE TO SCALING OF DISTRIBUTION SAMPLES

TECHNICAL FIELD

This application is generally related to electronic design automation and, more specifically, to estimating integrated circuit yield from modeled responses to scaling of distribution samples.

BACKGROUND

In circuit design verification, conditions for manufacturing an integrated circuits can be included in foundry models, for example, SPICE models of various manufacturing parameters. The foundry models can describe distributions of parameters that can vary during manufacture, such as an oxide thickness, oxide length, or the like.

A design verification tool can be utilized to evaluate a circuit design describing an integrated circuit relative to the manufacturing variability described in the foundry models. A designer can define outputs of the circuit design and define performance specifications for the outputs, which can be utilized during the evaluation. The design verification tool can utilize the evaluation to determine a probability that a particular manufacturing variation described in the foundry models might cause the circuit design to fail to meet the performance specifications.

When designers of integrated circuits have concerns about occurrences of rare failure events, for example, when designing computer memory devices, a popular technique can include performing Monte Carlo sampling of variable parameters in the foundry model, selecting a subset of the samples farthest from a nominal parameter value, and then simulating the circuit design with the selected subset of samples at one or more process, voltage, and temperature (PVT) corners. The design verification tool can compare the results of the simulation against the performance specifications to determine whether failures occurred, which can inform the designers about whether the worst of the MC samples from the foundry models would cause outputs of the circuit design to fail to meet the performance specification. While this Monte Carlo sampling technique can be effective at informing designers how often a particular rare failure would occur when considering a single combination of variable manufacturing parameters, i.e., the design verification tool assumes failures are monotonic along a single vector of input space, that assumption can break down when multiple different combinations of variable manufacturing parameters correspond to failures.

SUMMARY

This application discloses a computing system can implement a circuit verification tool to perform scaled sampling of parameter values in a foundry model describing parameter variations for a manufacturing process capable of fabricating an integrated circuit described in a circuit design. The computing system can simulate the circuit design with the scaled samples of the parameter values, and build a geometric model to describe a response of the circuit design to the scaled samples of the parameter values during the simulation. The geometric model can include one or more failure regions corresponding to geometric descriptions for failures of the circuit design to meet a specification during simulation with the scaled samples of the parameter values.

The computing system can estimate a yield for an output of the integrated circuit described by the circuit design based on the failure regions in the geometric model. Embodiments of will be described below in greater detail.

DETAILED DESCRIPTION

Illustrative Operating Environment

Figure 1:
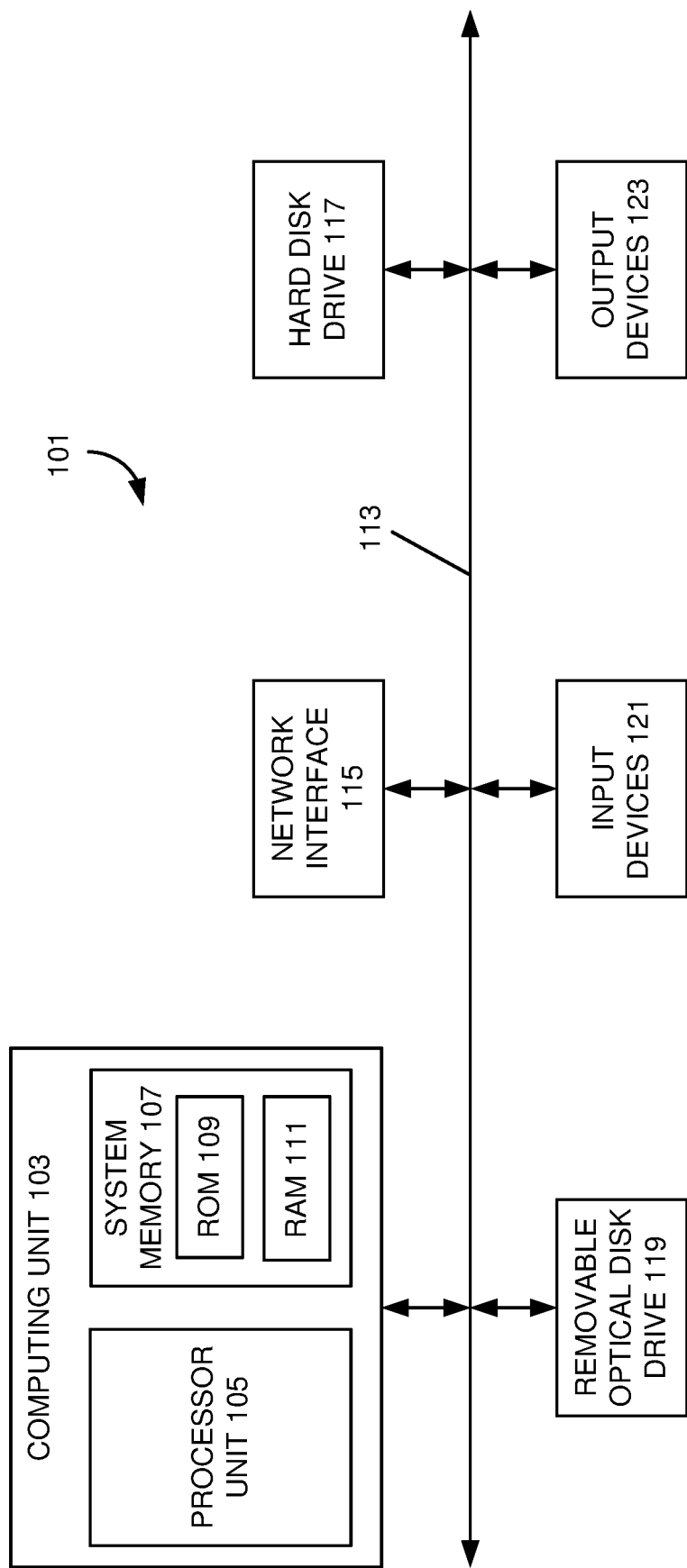
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
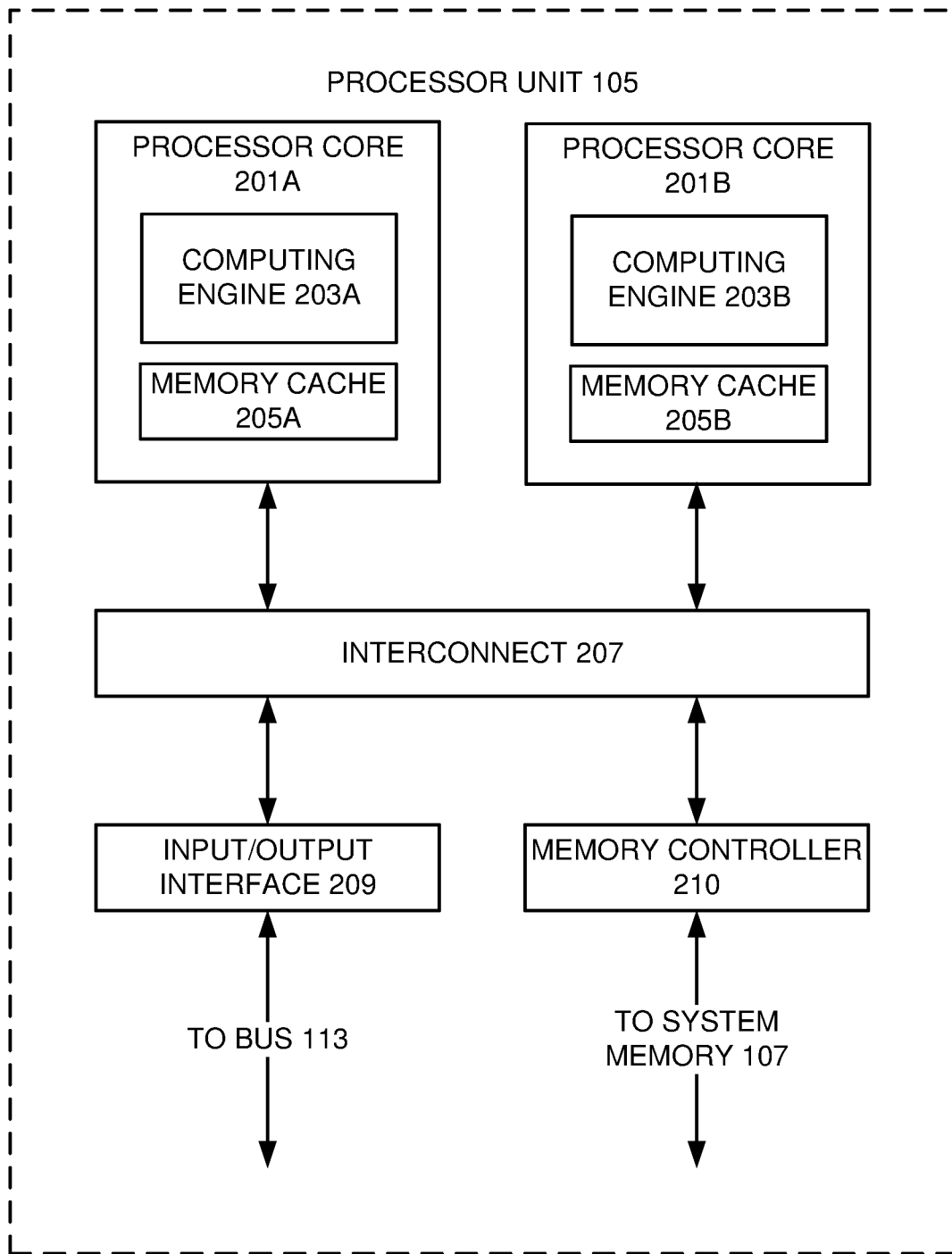

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Figure 3:
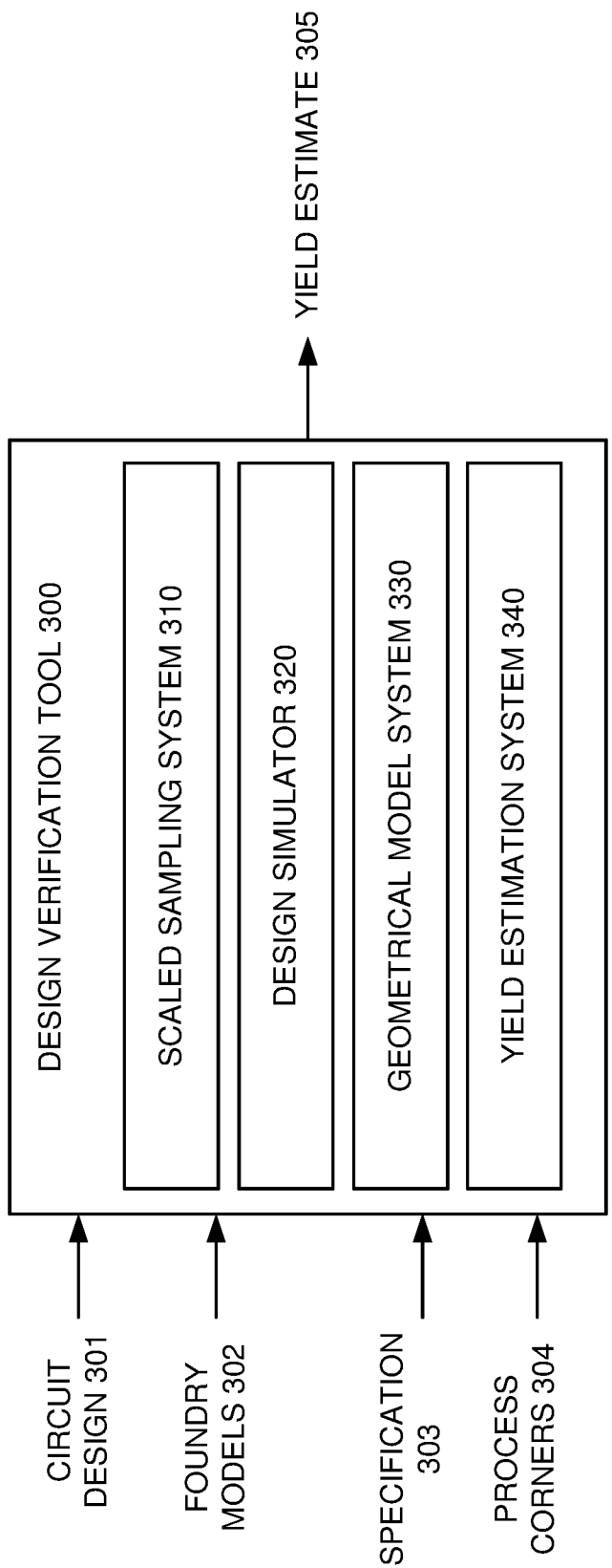
FIG. 3 illustrates an example design verification tool for estimating integrated circuit yield from modeled response to scaling of distribution samples that may be implemented according to various embodiments.
Figure 4:
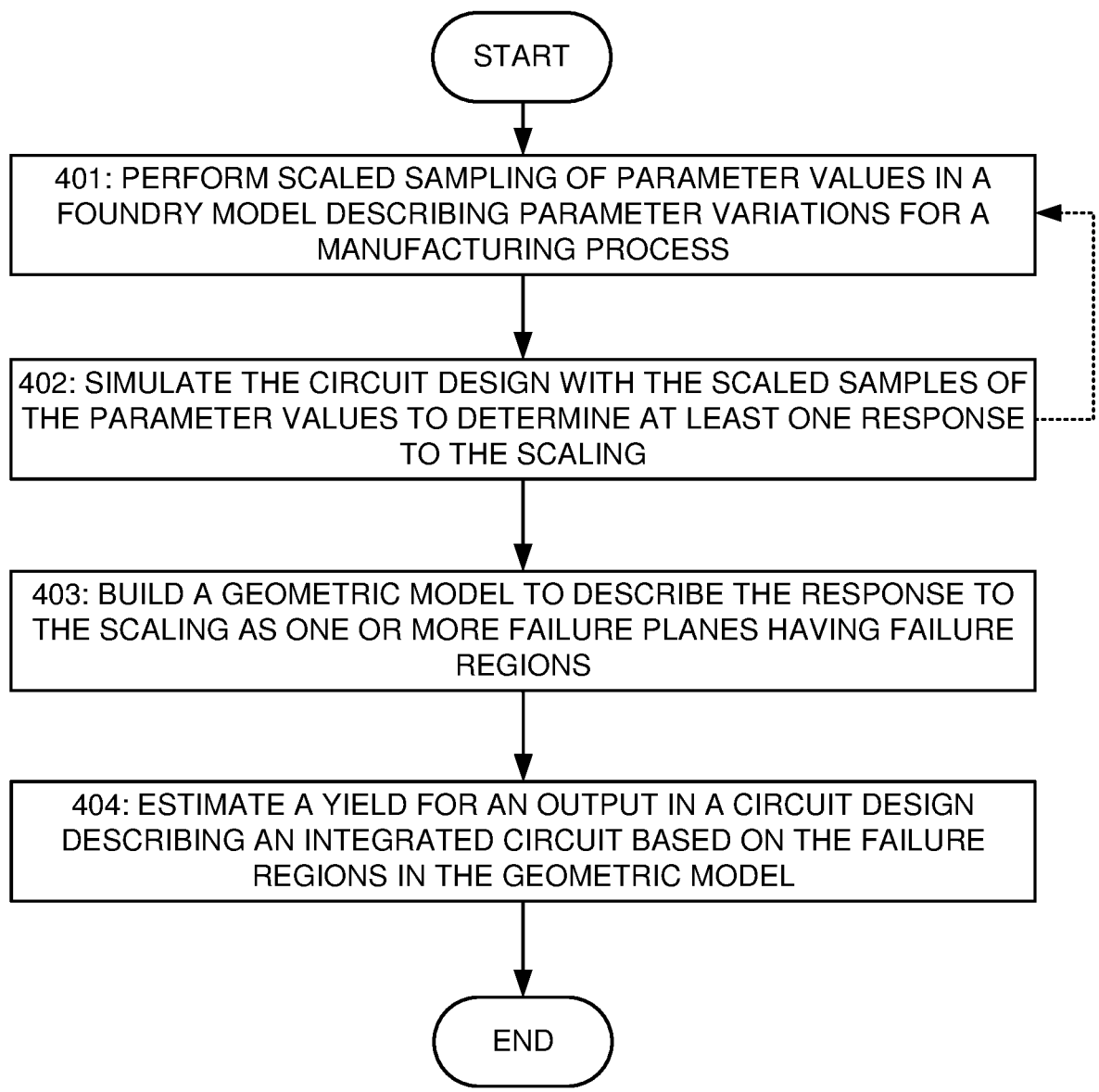
FIG. 4 illustrates a flowchart showing an example implementation of estimating integrated circuit yield from modeled response to scaling of distribution samples according to various examples.

Estimating Integrated Circuit Yield from Modeled Response to Scaling of Distribution Samples FIG. 3 illustrates an example design verification tool for estimating integrated circuit yield from modeled response to scaling of distribution samples that may be implemented according to various embodiments. FIG. 4 illustrates a flowchart showing an example implementation of estimating integrated circuit yield from modeled response to scaling of distribution samples according to various examples. Referring to FIGS. 3 and 4, a design verification tool 300, for example, implemented with the computing device 101 described in FIG. 1, can receive a circuit design 301 describing an electronic device, such as an integrated circuit, in a transistor-level netlist format. The circuit design 301 can correspond to transistor-level netlists describing electronic circuits using metal-oxide-semiconductor (MOS) transistors, resistances, capacitors, inductances, or the like, for example, in a Simulation Program with Integrated Circuit Emphasis (SPICE) file format.

The design verification tool 300 can receive foundry models 302 to describe manufacturing parameters, such as oxide thickness, oxide length, or the like, and how those parameters can vary during manufacturing. In some embodiments, the foundry models 302 can describe the statistical conditions for manufacturing the circuit design 301, for example, defining a distribution of values for the manufacturing parameters. In some embodiments, the foundry models 302 can be specified in a SPICE file format. The combination of the circuit design 301 and the foundry models 302, in some embodiments, can be called a test bench for the design verification tool 300.

The design verification tool 300 can receive a specification 303 for the performance or operation of the circuit design 301. In some embodiments, the specification 303 can define outputs associated with the circuit design 301 and define when values for the outputs would correspond to a failure. For example, the specification 303 can define a minimum value and a maximum value for an output in the circuit design 301 and deem the performance of the circuit design 301 a failure when the output value falls below the minimum value or exceeds the maximum value. The design verification tool 300 also can receive process corners 304 defining a combination of factors, such as process, voltage, and temperature (PVT), for the manufacture and/or operation of integrated circuits described by the circuit design 301.

The design verification tool 300 can include a scaled sampling system 310 that, in a block 401 of FIG. 4, can perform a scaled sampling of parameter values in the foundry model 302 describing variations of parameter values for a manufacturing process. In some embodiments, the scaled sampling system 310 can expand or scale the parameter value distribution in the foundry models 302 and then sample from the scaled distribution using a standard normal distribution. For example, the scaled sampling system 310 can expand or scale the parameter value distribution in the foundry models 302 to have a standard deviation of 3.5 before sampling the expanded or scaled parameter value distribution. As will be described below in greater detail, the scaling of the parameter value distribution can be performed with different values of the standard deviation. The sampling of the scaled distribution can be performed by randomly selecting parameter values from the scaled distribution, which can render the selection of a rare event much more likely.

In some embodiments, the scaled sampling system 310 can sample the parameter value distribution using a standard normal distribution having a mean of zero and a standard deviation of one and then scale a standard deviation of the samples. For example, the scaled sampling system 310 can sample the parameter value distribution using a standard normal distribution having a mean of zero and a standard deviation of one, and then scale the samples to have a scaled distribution having a mean of zero and a standard deviation of 3.5. As will be described below in greater detail, the scaling of the samples can be performed with different values of the standard deviation. Since the scaled sampling system 310 sampled the parameter value distribution with a standard normal distribution, in some embodiments, the scaled sampling system 310 can convert the scaled samples to a distribution in the foundry models 302, such as a normal distribution, a uniform distribution, a lognormal distribution, or the like.

The design verification tool 300 can include a design simulator 320 that, in a block 402 of FIG. 4, can simulate the circuit design 301 with scaled samples of the parameter values to determine at least one response to the scaling. The design simulator 320 can be a transistor-level simulator to simulate operation of the circuit design 301 having parameters that vary based on the scaled samples of the parameter values. Since the operation of the circuit design 310 can vary based on the values of the parameters, the design simulator 320 can generate values for outputs defined in the specification 303 that also vary. In some embodiments, the design simulator 320 also can perform the simulation of the circuit design 301 using multiple process corners 304, for example, an integrated circuit manufactured using different processes, operating with different drive voltages, and/or operating with different environment conditions, such as temperatures.

The design simulator 320 can determine whether any of the values of the outputs determined during simulation fall outside of the specification 303, for example, exceed a maximum value for the output or fall below a minimum value for the output. The design simulator 320 can record the values of the parameters utilize during the simulation, the values of the outputs generated with the values of the parameters, and when the values of the output fell outside of the specification 303.

The design simulator 320 can develop a response to the scaled sampling based on the recorded values of the parameters utilize during the simulation, the values of the outputs generated with the values of the parameters, and when the values of the output fell outside of the specification 303. The response to the scaled sampling can identify when failures occurred, for example, when the values of the output fell outside of the specification 303, and the corresponding combinations of parameter values simulated when those output values failed to meet the specification 303.

In some embodiments, when scaled samples corresponding to a 3.5 standard deviation meet the specification 303, the design simulator 320 can assume that all of the scales below 3.5 would also meet the specification 303. When a set of scaled samples fails to meet the specification 303, the design simulator 320 can prompt the scaled sampling system 310, for example, returning execution back to the block 401, to rescale and resample the parameter distribution in the foundry models 302 with a lower level of scaling. For example, when the initial scaling corresponds to 3.5 standard deviations, the rescaling can correspond to 3 standard deviations. The design simulator 320 can re-simulate the circuit design 301 with new scaled samples to determine when the variation introduced by the new scaled samples caused outputs of the circuit design 301 to fall inside or outside of the specification 303. In some embodiments, the response to scaled sampling can correspond to how the circuit design 301 responded to simulation with parameter values sampled with multiple different scales.

The design verification tool 300 can include a geometric model system 330 that, in a block 403 of FIG. 4, can build a geometric model to describe the response to the scaling. In some embodiments, the geometric model can include one more types of models having combinations of linear planes orthogonal or spherical surfaces and at some distance to an origin. The linear planes or spherical surfaces of the geometric model can correspond to failure planes or surfaces having one or more failure regions and a distance to each of the failure regions can correspond to a probability that a failure of output values occurs at each scale of the scaled samples. The geometric model can include a geometric description of the failure regions, for example, spatially defining the failure region according to the values of the scaled and sampled parameters prompting the simulated circuit design generate output values not meeting the specification 303.

In some examples, the geometric model system 330 can utilize multiple geometrical models in an attempt to model the response to scaling determined by the design simulator 320, and then select one of the geometric models as the built geometric model. In some embodiments, the geometric model system 330 decide which of the models to select by using a Maximum Likelihood Estimation (MLE) process to determine a shape that describes the response to scaling determined by the design simulator 320. When a geometric model has probability measured at different scales, for example, a combination of multiple failure regions each at a specific distance would produce a characteristic response to samples drawn at different scales, the geometric model system 330 can utilize the maximum likelihood estimation process to solve for the number of failure regions and the distance to each failure region that "fits" the observed probabilities in the response to scaling. In some embodiments, the geometric model can include failure regions as having a "square" shape bounded by two different probabilities. The geometric model system 330 can determine a failure of the output value occurred when both of the probabilities were met, which can allow the bounds of each probability to be solved using maximum likelihood estimation process.

The design verification tool 300 can include a yield estimation system 340 that, in a block 404 of FIG. 4, can estimate a yield for an output in the circuit design 301 describing the integrated circuit based on the failure regions in the geometric model. The yield estimation system 340 can output the yield estimate 305, which can predict a yield for an output defined in the specification 303 given the parameter distributions described in the foundry models 302. In some embodiments, the distances of the failure regions relative to an origin in the geometric model can correspond to a probability of failure for an output, which the yield estimation system 340 can utilize to estimate a failure probability of the output for an unscaled distribution of parameters. The yield estimation system 340 can determine the yield estimate 305 for the output based on the estimated failure probability of the output for an unscaled distribution of parameters.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
performing, by a computing system, scaled sampling of parameter values in a foundry model describing parameter variations for a manufacturing process capable of fabricating an integrated circuit described in a circuit design, wherein the scaled sampling of the parameter values includes:
  scaling a distribution of the parameter values in the foundry model, which expands the distribution of the parameter values in the foundry model so that the scaled distribution of the parameter values has a larger standard deviation than the distribution of the parameter values in the foundry model, and
  selecting samples of the parameter values from the scaled distribution;
simulating, by the computing system, the circuit design with the scaled samples of the parameter values;
building, by the computing system, a geometric model to describe a response of the circuit design to the scaled samples of the parameter values, wherein the geometric model is configured to include one or more failure regions corresponding to geometric descriptions for failures of the circuit design to meet a specification during simulation with the scaled samples of the parameter values; and
estimating, by the computing system, a yield for an output of the integrated circuit described by the circuit design based on the geometric mode describing the response of the circuit design to the scaled samples of the parameter values during the simulation.

2. The method of claim 1, wherein estimating the yield for the output of the circuit design further comprises:
measuring distances to the failure regions in the geometric model, which corresponds to probabilities of failure for the failure regions; and
extrapolating a probability of failure for the output of the integrated circuit from the measured distances to the failure regions in the geometric model, wherein the probability of failure for the output of the integrated circuit corresponds to the yield for the output of the circuit design.

3. The method of claim 1, wherein building the geometric model further comprises:
applying the response of the circuit design to the scaled samples of the parameter values to multiple geometric models; and
selecting one of the geometric models based, at least in part, on a maximum likelihood estimation used to determine a fit of the response of the circuit design to the multiple geometric models.

4. The method of claim 1, wherein the scaled sampling of the parameter values is performed with different levels of scaling, and wherein the simulating of the circuit design is performed with the scaled samples of the parameter values having the different levels of the scaling.

5. The method of claim 1, wherein the foundry model includes a probability distribution for occurrences of the parameter values during the manufacturing process.

6. A system comprising:
a memory system configured to store computer-executable instructions; and
a computing system, in response to execution of the computer-executable instructions, is configured to:
perform scaled sampling of parameter values in a foundry model describing parameter variations for a manufacturing process capable of fabricating an integrated circuit described in a circuit design, wherein the scaled sampling of the parameter values includes:
scaling a distribution of the parameter values in the foundry model, which expands the distribution of the parameter values in the foundry model so that the scaled distribution of the parameter values has a larger standard deviation than the distribution of the parameter values in the foundry model, and
selecting samples of the parameter values from the scaled distribution;
simulate the circuit design with the scaled samples of the parameter values;
build a geometric model to describe a response of the circuit design to the scaled samples of the parameter values, wherein the geometric model is configured to include one or more failure regions corresponding to geometric descriptions for failures of the circuit design to meet a specification during simulation with the scaled samples of the parameter values; and
estimate a yield for an output of the integrated circuit described by the circuit design based on the geometric mode describing the response of the circuit design to the scaled samples of the parameter values during the simulation.

7. The system of claim 6, wherein the computing system, in response to execution of the computer-executable instructions, is further configured to estimate the yield for the output of the circuit design by:
measuring distances to the failure regions in the geometric model, which corresponds to probabilities of failure for the failure regions; and
extrapolating a probability of failure for the output of the integrated circuit from the measured distances to the failure regions in the geometric model, wherein the probability of failure for the output of the integrated circuit corresponds to the yield for the output of the circuit design.

8. The system of claim 6, wherein the computing system, in response to execution of the computer-executable instructions, is further configured to build the geometric model by:
applying the response of the circuit design to the scaled samples of the parameter values to multiple geometric models; and
selecting one of the geometric models based, at least in part, on a maximum likelihood estimation used to determine a fit of the response of the circuit design to the multiple geometric models.

9. The system of claim 6, wherein the computing system, in response to execution of the computer-executable instructions, is further configured to perform scaled sampling of the parameter values with different levels of scaling, and simulate the circuit design with the scaled samples of the parameter values having the different levels of scaling.

10. An apparatus comprising at least one computer-readable memory device storing instructions configured to cause one or more processing devices to perform operations comprising:
performing scaled sampling of parameter values in a foundry model describing parameter variations for a manufacturing process capable of fabricating an integrated circuit described in a circuit design, wherein the scaled sampling of the parameter values includes:
scaling a distribution of the parameter values in the foundry model, which expands the distribution of the parameter values in the foundry model so that the scaled distribution of the parameter values has a larger standard deviation than the distribution of the parameter values in the foundry model, and
selecting samples of the parameter values from the scaled distribution;
simulating the circuit design with the scaled samples of the parameter values;
building a geometric model to describe a response of the circuit design to the scaled samples of the parameter values, wherein the geometric model is configured to include one or more failure regions corresponding to geometric descriptions for failures of the circuit design to meet a specification during simulation with the scaled samples of the parameter values; and
estimating a yield for an output of the integrated circuit described by the circuit design based on the geometric mode describing the response of the circuit design to the scaled samples of the parameter values during the simulation.

11. The apparatus of claim 10, wherein the instructions are configured to cause one or more processing devices to perform operations further comprising estimating the yield for the output of the circuit design by:
measuring distances to the failure regions in the geometric model, which corresponds to probabilities of failure for the failure regions; and
extrapolating a probability of failure for the output of the integrated circuit from the measured distances to the failure regions in the geometric model, wherein the probability of failure for the output of the integrated circuit corresponds to the yield for the output of the circuit design.

12. The apparatus of claim 10, wherein the instructions are configured to cause one or more processing devices to perform operations further comprising building the geometric model by:
applying the response of the circuit design to the scaled samples of the parameter values to multiple geometric models; and
selecting one of the geometric models based, at least in part, on a maximum likelihood estimation used to determine a fit of the response of the circuit design to the multiple geometric models.

13. The apparatus of claim 10, wherein the instructions are configured to cause one or more processing devices to perform operations further comprising performing the scaled sampling of the parameter values with different levels of scaling, and simulating the circuit design with the scaled samples of the parameter values having the different levels of the scaling.

14. The apparatus of claim 10, wherein the foundry model includes a probability distribution for occurrences of the parameter values during the manufacturing process.

* * * * *